United States Patent [19]
Ratakonda

[11] Patent Number: 5,995,095
[45] Date of Patent: Nov. 30, 1999

[54] METHOD FOR HIERARCHICAL SUMMARIZATION AND BROWSING OF DIGITAL VIDEO

[75] Inventor: Krishna Ratakonda, Urbana, Ill.

[73] Assignee: Sharp Laboratories of America, Inc., Camas, Wash.

[21] Appl. No.: 09/316,599

[22] Filed: May 21, 1999

Related U.S. Application Data

[63] Continuation of application No. 08/994,558, Dec. 19, 1997.

[51] Int. Cl.$^6$ ....................................................... G06T 1/00
[52] U.S. Cl. ............................... 345/328; 382/225; 386/4; 386/52
[58] Field of Search ..................................... 345/328, 348, 345/349; 383/4, 52, 64; 382/225

[56] References Cited

U.S. PATENT DOCUMENTS

| | | |
|---|---|---|
| 5,099,322 | 3/1992 | Gove . |
| 5,339,166 | 8/1994 | LeBrat et al. . |
| 5,485,611 | 1/1996 | Astle . |
| 5,519,789 | 5/1996 | Etoh ......................................... 382/225 |
| 5,521,841 | 5/1996 | Arman et al. . |
| 5,531,306 | 7/1996 | Mills et al. . |
| 5,537,528 | 7/1996 | Takahashi et al. . |
| 5,550,965 | 8/1996 | Gabbe et al. . |
| 5,600,775 | 2/1997 | King et al. . |
| 5,606,655 | 2/1997 | Arman et al. . |
| 5,635,982 | 6/1997 | Zhang et al. . |
| 5,642,294 | 6/1997 | Taniguch et al. . |
| 5,708,732 | 1/1998 | Merhav et al. . |
| 5,821,945 | 10/1998 | Yeo et al. . |

FOREIGN PATENT DOCUMENTS 0 615 245 A2  9/1994  European Pat. Off. .

OTHER PUBLICATIONS

Mills et al., A Magnifier Tool for Video Data, ACM May, 1992.
Mann et al., Video Orbits of the Projective Group: A New Perespective on Image Mosaicing, MIT Media Laboratory Perceptual Computing TR No. 338, 1995.
Chen et al., A multi–layer Video Browsing System, Comm & MultiMedia Lab, NTU, 1995.
Lagendijk et al., Visual Search in a SMASH System, International Conference on Image Processing, IEEE Signal Processing Society, Sep. 16–19 1996, pp. 671–674.
Yeung et al., Time–constrained clustering for segmentation of video stored into story units, Proc. of ICPR, 1996.
Smith et al., Video Skimming and Characterization Through the Combination of Image and Language Understanding Techniques, School of Computer Science, Carnegie Mellon University, Feb. 3, 1997.
Puri et al., Digital Video: An Introduction to MPEG–2, Chapman & Hall, 1997 (Table of Contents).

*Primary Examiner*—Raymond J. Bayerl
*Assistant Examiner*—Sy Luu
*Attorney, Agent, or Firm*—Robert D. Varitz, PC

[57] ABSTRACT

A method of hierarchical digital video summarization and browsing includes inputting a digital video signal for a digital video sequence and generating a hierarchical summary based on keyframes of the video sequence. Additional steps may include computing histograms for the digital video sequence; detecting shot boundaries within the digital video sequence; determining the number of keyframes to be allocated within each shot; locating the actual position of each keyframe within each shot; identifying keyframe locations by the largest consecutive difference criteria; pruning keyframes for an shot without meaningful action; extracting keyframes efficiently in the case of compressed video; and browsing the shots using the hierarchical keyframe summary.

4 Claims, 6 Drawing Sheets

METHOD FOR HIERARCHICAL SUMMARIZATION AND BROWSING OF DIGITAL VIDEO

RELATED APPLICATION

This application is a continuation of Ser. No. 08/994,558, filed Dec. 19, 1997 pending for METHOD FOR HIERARCHICAL SUMMARIZATION AND BROWSING OF DIGITAL VIDEO, and is related to "Method for Detecting Transitions in Sampled Video Sequences,", Ser. No. 09/004,058, filed Jan. 7, 1998.

FIELD OF THE INVENTION

This invention relates to determining representation of a digital video sequence by a set of still images in a hierarchical summary for applications such as (i) visual identification of video content; (ii) video indexing; (iii) video browsing; and (iv) video editing. The digital video sequence may be Moving Pictures Experts Group (MPEG) compressed and the representation may be determined with minimal decoding of the compressed bitstream.

BACKGROUND OF THE INVENTION

Compact representation of video is essential to many information query and retrieval applications. Examples of such applications range from multi-media database access to skimming (fast forwarding) through a video clip. Most previous approaches have mainly concentrated on splitting a given video segment into "shots." Each shot is represented by a keyframe which summarizes the shot. Thus one may view these representative frames instead of browsing through the entire video. Shot detection may be achieved with high accuracy (>90%) and few misses (<5%). Histogram based approaches are among the most successful shot detection strategies as well as being the least computationally demanding. A comparison between various shot detection strategies may be found in the literature. Many of these schemes also take into account some special situations of interest: pan, zoom, dissolve and fade in determining video shot boundaries.

Known techniques generally concentrate on detecting shot boundaries or scene changes and using a collection made up of a single frame from each shot as keyframes representing the video sequence. Assigning more than one keyframe to each shot provides better summaries representing the video content. Such known summarization methods, however, provide a single layer summary without any flexibility.

Other known techniques make use of color histograms and describe methods for forming histograms from MPEG bitstreams (e.g., histograms of DC coefficients of 8×8 block DCT). Although, this is relatively straightforward for I (intra-coded) frames, there is more than one way of recovering DC (zero frequency) coefficients of a P (predicted) frame or B (bi-directionally predicted) frame with minimal decoding of its reference picture.

Known references that are concerned with discrete cosine transformation (DCT)-compressed video however, do not address at all the practical aspects of a working system. For example, after they are identified, keyframes have to be decoded for visual presentation. None of the known references specify an efficient mechanism for decoding keyframes that may be positioned at arbitrary locations of the bitstream, without decoding the entire video sequence.

A major limitation of the above schemes is that they treat all shots equally. In most situations it might not be sufficient to represent the entire shot by just one frame. This leads to the idea of allocating a few keyframes per each shot depending on the amount of "interesting action" in the shot. The current state of the art video browsing systems thus split a video sequence into its component shots and represent each shot by a few representative keyframes, where the representation is referred to as "the summary".

The invention improves and extends the method disclosed by L. Lagendijk, A. Hanjalic, M. Ceccarelli, M. Soletic, and E. Persoon, "Visual Search in SMASH System", Proceedings of International Conference on Image Processing, pp. 671–674, Lausanne, 1996, hereinafter "Lagendijk.".

SUMMARY OF THE INVENTION

The invention is a method of hierarchical digital video summarization and browsing, and includes, in its basic form, inputting a digital video signal for a digital video sequence and generating a hierarchical summary based on keyframes of the video sequence. Additional steps may include computing histograms for the digital video sequence; detecting shot boundaries within the digital video sequence; determining the number of keyframes to be allocated within each shot; locating the actual position of each keyframe within each shot; identifying keyframe locations by the largest consecutive difference criteria; pruning keyframes for an shot without meaningful action; extracting keyframes efficiently in the case of compressed video; and browsing the shots using the hierarchical keyframe summary.

"Video summarization" refers to determining the most salient frames of a given video sequence that may be used as a representative of the video. A method of hierarchical summarization is disclosed for constructing a hierarchical summary with multiple levels, where levels vary in terms of detail (i.e., number of frames). The coarsest, or most compact, level provides the most salient frames and contains the least number of frames.

An object of the invention is to provide a method for creating a hierarchical, multi-level summary wherein each level corresponds to a different level of detail.

Another object of the invention is to provide a method for improving keyframe selection.

Another object of the invention is to detect and utilize motion content of the scene, specifically, zoom and pan, and present them to the user, along with the hierarchical frame summary.

A further object of the invention is to provide a method for creating a hierarchical, multi-level summary of an MPEG-2-compressed video where each level corresponds to a different level of detail.

Yet another object of the invention is to provide a method that is directly applicable to an MPEG-2 compressed video for constructing histograms and generating a hierarchical summary with minimal decoding of the bitstream.

Another object of the invention is to provide a complete efficient system for generating summaries of MPEG-2 compressed video.

Still another object of the invention is to provide an efficient way of handling histogram computation for MPEG bitstreams.

DETAILED DESCRIPTION OF THE PREFERRED EMBODIMENTS

Because the current technology for automatic capturing of semantic saliency is not yet mature, video summarization methods rely on low-level image features, such as color histograms. Video summarization is a way of determining the most salient frames of a given video sequence that may be used as a representative of the video. It is possible that a particular frame carrying important information may not be included in a single summary containing a pre-specified total number of frames.

Figure 1:
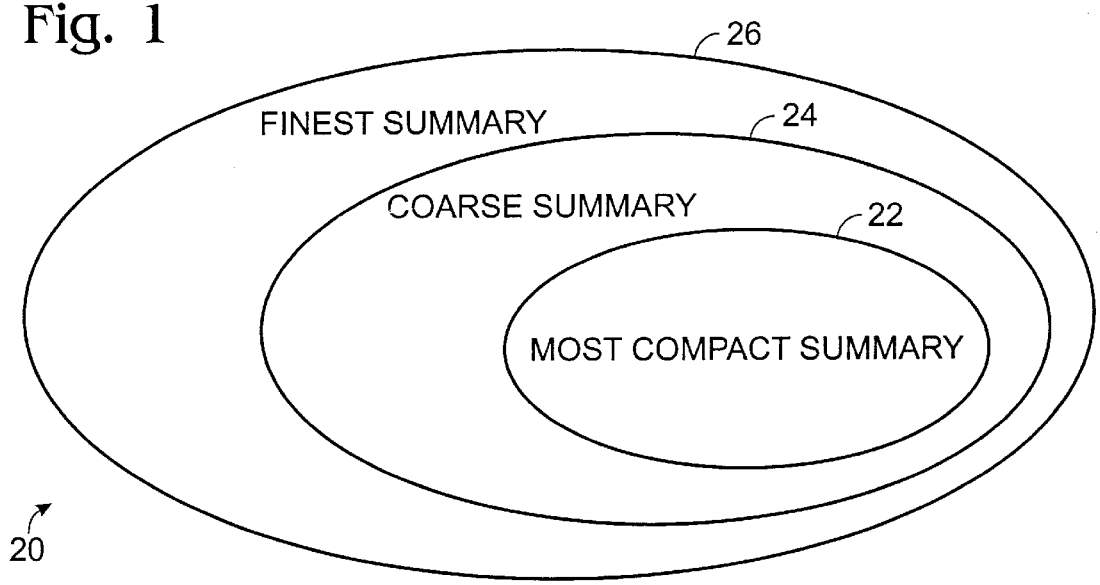
FIG. 1 is a representation of the hierarchical structure of a video summary for three levels.

Referring now to FIG. 1, a hierarchical multilevel summary 20, which is generated by the hierarchical summarization method of the invention, may provide a detailed fine-level summary with sufficiently large number of frames, so that important content information is not lost, but at the same time provide less detailed summaries at coarser levels in order not to hinder the usage of a coarse or compact summary for fast browsing and identification of the video. Hierarchical multilevel summary 20 includes a most compact summary, 22, at the coarsest level, which should suffice until more detailed information is deemed to be necessary and the finer level summaries are invoked, such as the coarse summary 24 and the finest summary 26. Although three levels of summation are depicted in FIG. 1, it should be appreciated that the hierarchical summary of the invention may make use of any number of levels greater than one.

Summary 20 also facilitates fast browsing through a database of video sequences where browsing may be performed on the basis of the most compact summary and progressive refinement of the summary to more detailed levels may be performed at user's request.

Hierarchical, multi-level summarization facilitates an effective way of visual interactive presentation of video summary to the user. The user may interact with the summary via a graphical user interface, for refining the summary, visualizing different levels of the summary, and playing back the video between any two keyframes of the summary at any level. Users of the method disclosed herein may specify the maximum number of keyframes in the summary and the number of levels of the hierarchy, and thus the system is controllable for limited memory and resource applications.

The method disclosed herein is applicable to both uncompressed (or decompressed) or DCT-based (discrete cosine transform-based) compressed video, such as MPEG compressed video, or other motion-compensated predictive compressed video. In the case of MPEG compressed video, summarization is performed with minimal decoding of the bitstream and with an efficient way of decoding the keyframes, resulting in reduced computational and memory capacity requirements. The examples provided herein are of MPEG-2 compressed video, but, as noted above, are applicable to any DCT-based compressed video. Those of skill in the art will understand that a reference to an MPEG video is a reference to a compressed video stream, unless otherwise noted.

In the hierarchical summarization method disclosed herein, detection of special effects, such as fades, via postprocessing, is supported. Segments containing such effects are not included in the summarization process in order not to adversely effect its accuracy. Provisions are also allowed in the method for detecting pan and zoom segments for most compact and expressive representation in the summary.

A video sequence may be indexed on the basis of its summary frames using techniques developed for still images. Multiple levels provide flexibility towards indexing at varying detail level.

The hierarchical approach of the invention allows the user quickly to browse through a collection of video sequences by considering their most compact summaries 22, with an option of accessing a finer summary, 24, 26, if the content of the most compact summary is indeed interesting. A user of the method of this invention has the flexibility of refining the summary at selected segments of the video sequence.

When used to summarize a MPEG video sequence, two components, referred to as "bitstream index table generator" and "decoder manager", are provided. These components are necessary to efficiently decode the keyframes in order to generate a visual summary and subsequently browse through the video without decoding it in its entirety.

Figure 2:
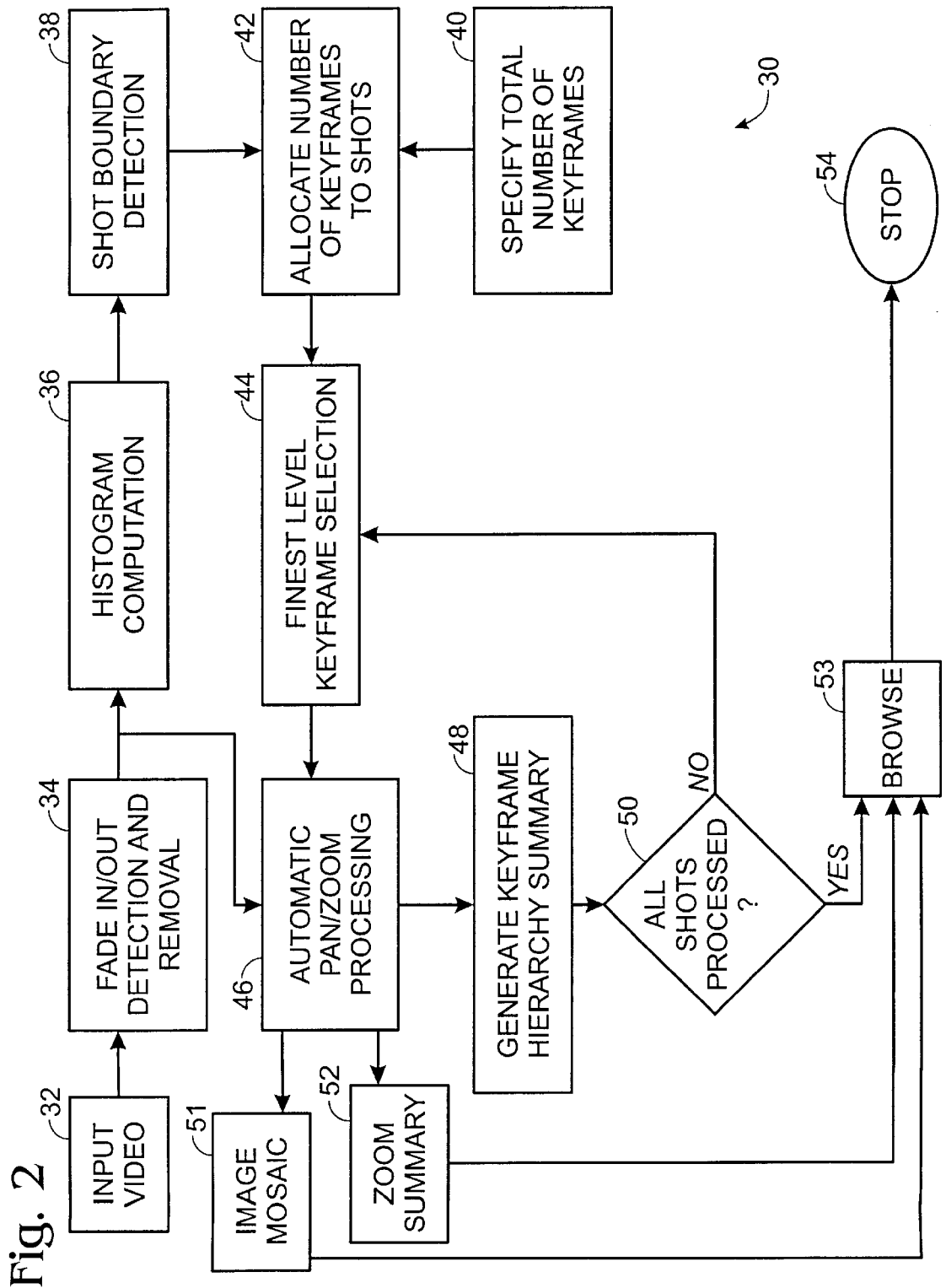
FIG. 2 is a block diagram of the first embodiment of the method of the invention.
Figure 4:
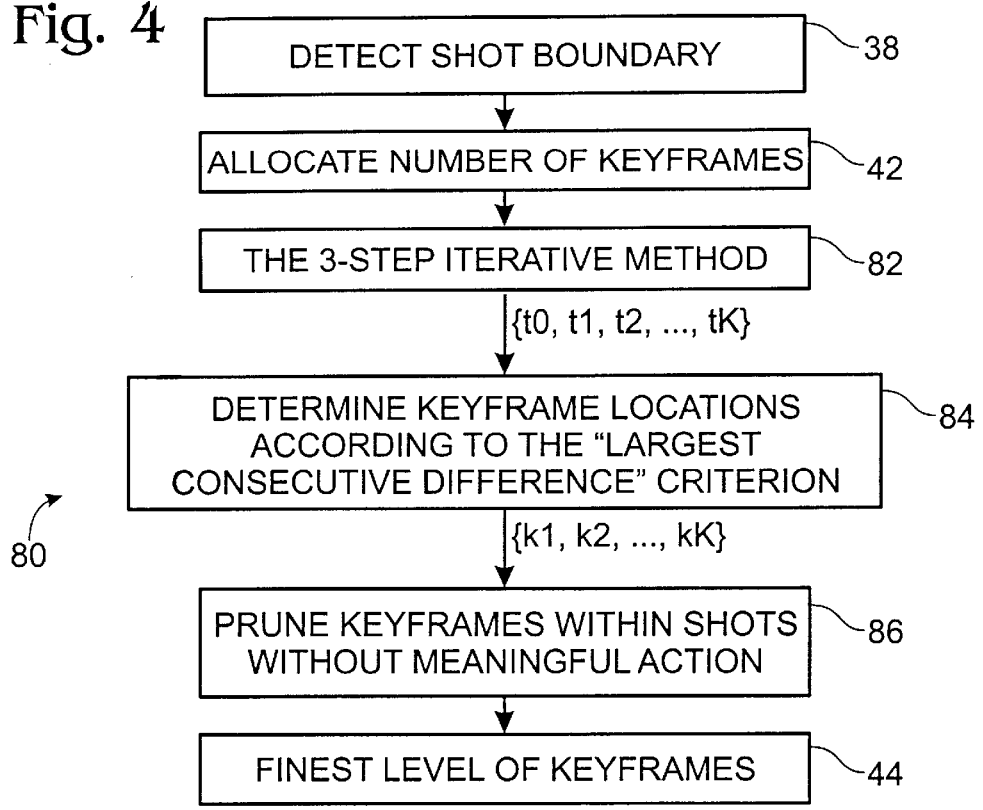
FIG. 4 is a block diagram of a fine-level key-frame selection algorithm of the invention.

The overall method of the invention is summarized, generally at 30, in FIG. 2. The method is intended to operate on a video camera and recorder, such as a camcorder, or on a computer system having the capability to, at a minimum, place video sequences, and, ideally, to store large amounts of video data, which video data serves as video input 32. The mechanism which includes the method of the invention is referred to herein as a "system." Input video 32 is first processed to detect and remove frames that are involved special effects, such as fade in or fade out, 34, because fade in/out frames will result in spurious shot boundaries and keyframes. Such frames are classified as global motion events, and are subsequently excluded from further processing. The next step is histogram computation 36. Image color histograms, i.e., color distributions, constitute representative feature vectors of the video frames and are used in shot boundary detection 38 and keyframe selection. Shot boundary detection 38 is performed using a threshold method, where differences between histograms of successive frames are compared. Given total number of keyframes (user specified) 40, each shot is assigned a number of keyframes 42 depending on the "action" within the shot, according to well known techniques. Finest level keyframe selection 44 is performed using an improved version of the Lagendijk technique. The implementation disclosed herein includes an improved version of this technique by incorporating additional new steps, as shown in FIG. 4, to be more fully described later herein, wherein an expansion of the finest-level keyframe selection method is provided.

Referring again to FIG. 2, the automatic pan/zoom processing, 46, which results in generation of an image mosaic, 51, and a zoom summary, 52, are optional steps, and will be explained later herein. The next step is the new method for generating keyframe hierarchy 48, i.e., summary at coarser detail than the finest level summary. This process is also described in detail later herein. It is based on a variation on the theme of vector quantization. Once the finest and coarse level summaries are determined for a given shot, the process is repeated for other shots in the video sequence, block 50. Additional steps include browsing the hierarchical summary, block 53, and termination of the process, block 54.

Automatic Pan/Zoom Processing

Figure 3:
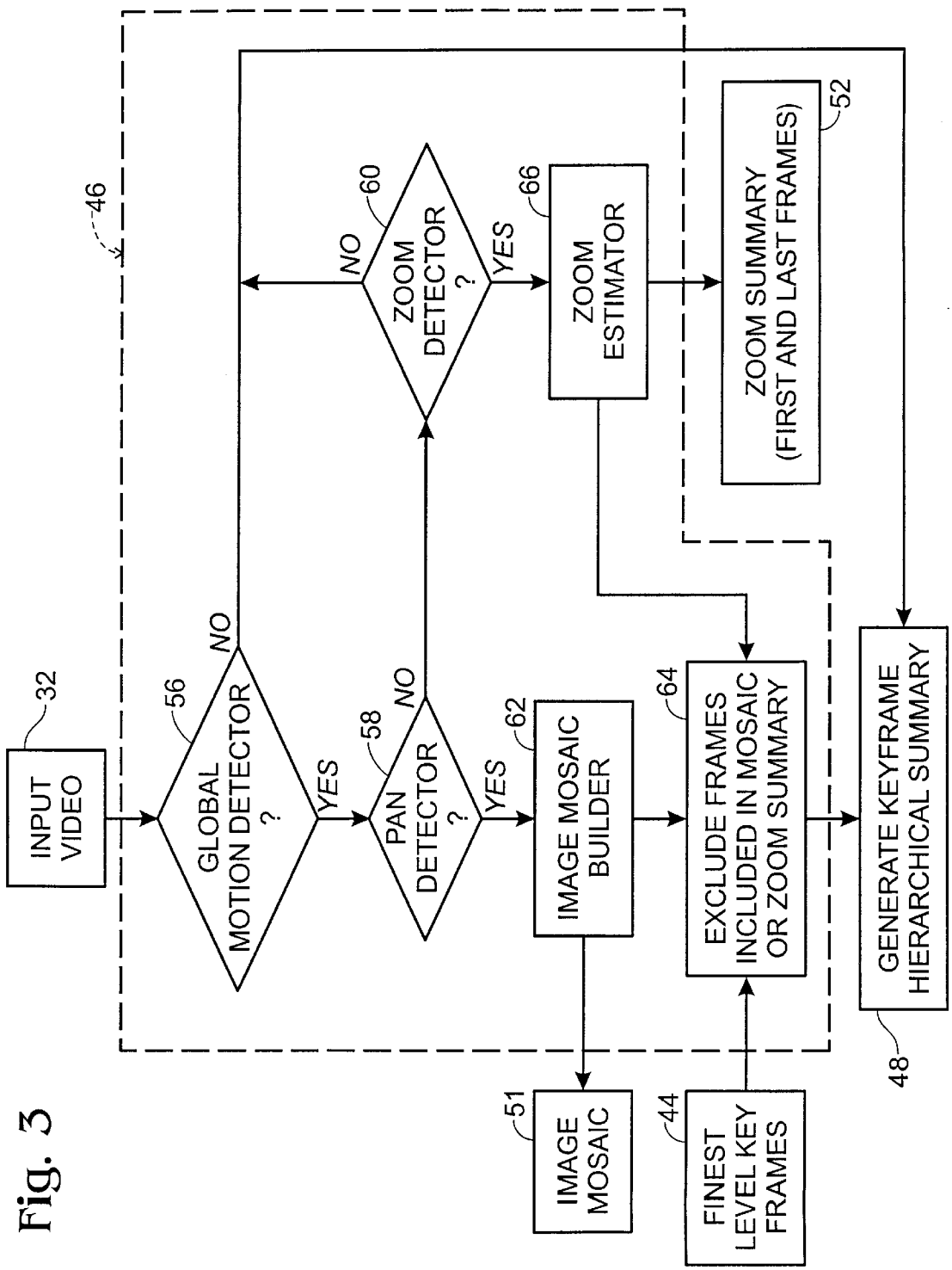
FIG. 3 is a block diagram of an automatic pan/zoom processing module of the invention

The steps of automatic pan/zoom processing 46 are shown in FIG. 3, which include detecting pan and zoom events in the digital video sequence. Frames that contain global motion are detected 56. This is a pre-screening method aimed at identifying those frames that undergo global motion. These frames may be compactly represented using an image mosaic, if the global motion due to camera pan, as detected by pan detector 58, or by zoom summary 52, i.e., the first and last frames of a zoom-in or zoom-out sequence as detected by zoom detector 60 and compiled by zoom estimator 66. Hence mosaic building 62 is only attempted for those frames that exhibit a global pan motion and which result in image mosaic 51. Frames that take part in image mosaic 51 or in a zoom-in or zoom-out sequence are excluded from the finest level summary, block 64, as the finest level summary is further processed to form the coarser, more compact, levels.

In an alternative embodiment, pan/zoom processing 46 may be done interactively rather than automatically. The user may select from finest keyframes summary selected, 44, those keyframes that constitute the start and ending of a pan sequence, and the system may construct image mosaic 51 in response, and present it to the user. The user may identify or tag frame numbers K and L, i.e., the two keyframes between which there is a camera pan. Mosaic builder 62 considers frames between frame number K−n and L+n in building a mosaic, where "n" is a predetermined offset. Mosaic builder 62 may be implemented according to image stitching techniques well known to those of ordinary skill in the art.

In the case of zoom, as with pan, the user may manually specify the beginning and ending frames, or an automatic zoom detection algorithm may be employed, which, again, is an algorithm well-known to those of ordinary skill in the art.

Figure 5:
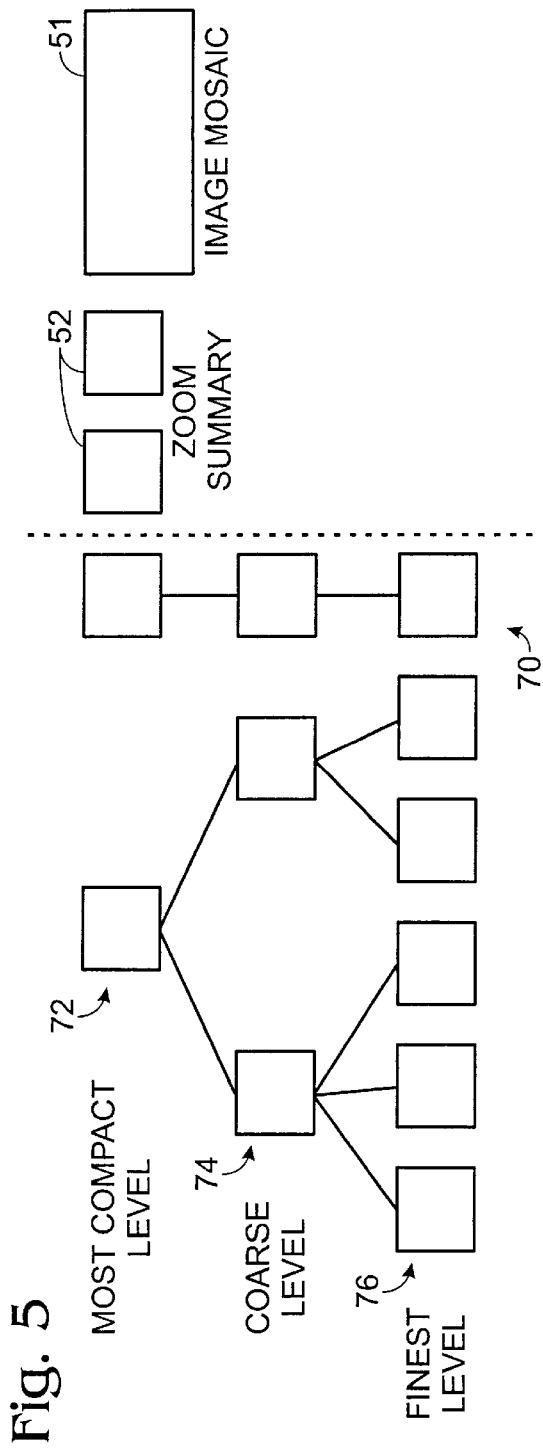
FIG. 5 is a block diagram of the hierarchical summary of the invention.

A form for the hierarchical summary is depicted in FIG. 5, generally at 70. The hierarchical summary is divided into hierarchical keyframe levels. The user may be first presented with the most compact (coarsest) level summary 72, i.e., the most compact summary, possibly along with image mosaic 51 and zoom summary 52. Then the user may tag a parent and see the child(ren) frames in the finer level, referred to herein as a coarse level 74. Tagging frames in the finest level 76 results in playback of the video; for instance if the j-th keyframe is tagged at the finest level, frames between the j th and (j+1) st keyframes are played back. In an actual GUI implementation the children-parent relationships may be explicitly indicated during display. As used herein, "tag" or "tagging" may be accomplished by identifying a particular object on a computer monitor, as by clicking on a particular frame. The keyframes in the hierarchical summary may be spatially sub-sampled into "thumbnails" for cost effective storage and fast retrieval and display of the summary. Normal playback of a video sequence will be at the finest level, however, playback may also be done at a coarser level.

Uncompressed Video Input

The first embodiment of the invention is referred to herein as a "pixel domain" approach to hierarchical digital video summarization and browsing, and required an uncompressed digital video input 32.

Assume that the total number of keyframes to be used for the entire video sequence is given (which is normally dictated by storage space requirements). Lagendijk's technique has three key steps:

1. Detect shot boundaries,
2. Determine the number of keyframes to be allocated to each shot, and
3. Find the positions of the keyframes within each shot.

The technique used in this invention is depicted generally at 80 in FIG. 4, and includes a 3-step iterative method 82. Detecting shot boundaries, block 38, FIG. 2, is done using a histogram based approach with a dynamic threshold. It is assumed that the first n, typically n=3, frames of the sequence do not correspond to shot boundaries. The mean action measure $A_m$ and the standard deviation of action measure $A_{sd}$ are determined by computing the mean and standard deviation of the action measures, respectively, defined later herein, across the first n frames. The threshold is set to $A_m+\alpha A_{sd}$. Once a boundary is detected according to this threshold, a new threshold is determined for the next shot in this same fashion using the first n frames of this new shot. The value of parameter $\alpha$ typically is set to 10.

The action measure $(A(.,.))$ between two histograms ($h_1$ and $h_2$) is defined to be (the $l_1$ norm):

$$A(h_1, h_2)=\Sigma_i|h_1(i)-h_2(i)| \quad (1)$$

The cumulative action measure $(C(.))$ for a shot (s) with n frames $s_1, \ldots, s_n$ is defined to be:

$$C(x) = \sum_{s_i=s_1}^{s_x} A(h_{s_i}, h_{s_{i-1}}), (x \le n) \quad (2)$$

The cumulative action measure for each shot, and the sum of the cumulative action measures of each shot is thus found. The number of keyframes allocated to a particular shot "s", block 42, is proportionate to the relative amount of cumulative action measure within that shot.

Locating the actual positions of the keyframes within the shot may be posed as an $l_1$ minimization problem. Each keyframe represents (and replaces) a contiguous set of video frames. The union of these contiguous sets of video frames is the entire shot. Since each of these contiguous sets of video frames is represented by a single keyframe, one would like to ensure that the amount of action within one contiguous set of video frames is small. The rationale behind this is that if there is too much "action" within one contiguous set of video frames, a single keyframe might not be able to represent it fully. Thus, given the total number of keyframes to be assigned to one shot (which is the same as the number of contiguous sets into which the shot is split), a minimization procedure which finds the keyframes that minimize the "action" within corresponding contiguous sets of video frames is used. Given that K keyframes are to be positioned within a shot s, let the location of the keyframes be $k_j$ (j=1, …, K). Further, let $t_{j-1}, \ldots, t_j-1$ be the contiguous set of video frames represented by the keyframe at $k_j$. In other words $[t_{j-1}, t_j-1]$ is the shot segment which is represented by the keyframe $k_j$. The following cost criterion must be minimized over all possible $t_j$ ($k_j$ are determined by selecting $t_j$, i.e., $k_j=(t_j+t_{j-1})/2$)):

$$g(k_1, \ldots, k_K, t_1, \ldots, t_{K-1}) = \sum_{j=1}^{j=K} \int_{t_{j-1}}^{t_j} |C(x) - C(k_j)| dx \qquad (3)$$

Note that $t_0$ and $t_K$ are the first and last frames of the shot (and hence are constants). Once $k_j=(t_j+t_{j-1})/2$ is substituted in the above cost criterion, the optimum solution satisfies $2C(t_i)-C(k_i) \leq C(k_{i+1})$.

In order to carry out the minimization, following steps are performed in an iterative way, which differs from that of the Lagendijk technique.

1. Set $k_1=1$ (assume that $t_0=0$ and the second frame is chosen as a candidate for being the first keyframe.)
2. For i=1 through K−1
   $t_i=2k_i-t_{i-1}$.
   Define $k_{i+1}$ to be the first video frame (i.e., video frame with the smallest subscript, n, that is greater than $t_i$) for which $2C(t_i)-C(k_i) \leq C(k_{i+1})$ holds.
3. For i=K, compute $t'_K=2k_K-t_{K-1}$. If $t_K>2k_K-t_{K-1}=t'_K$, increment $k_1$ by 1 and Go to Step 2. Otherwise, keep the results of the previous iteration, add an offset to all $k_j$s so that $t_K=t'_K$, and Stop.

Figure 6:
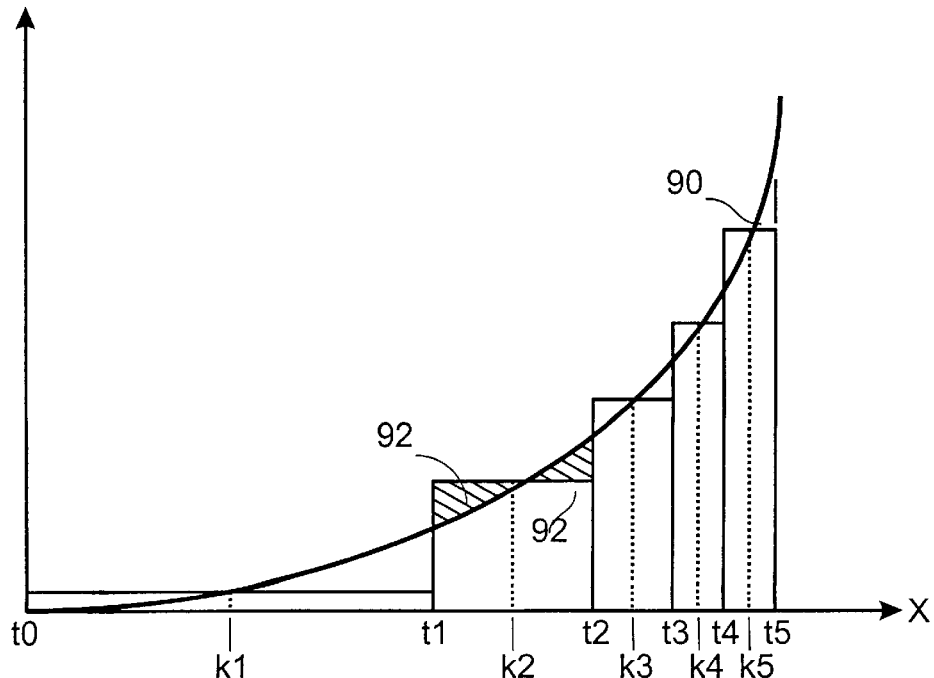
FIG. 6 is an illustration of cumulative action measures (C(x)), distribution of keyframes ($k_j$) and corresponding shot segments ($t_{j-1}$, $t_j$).

The minimization may be carried out in a finite number of steps, as depicted in FIG. 6. Cumulative error is a nondecreasing function within a shot. Thus the above minimization procedure is aimed at finding those keyframes, $k_j$, which give the best stair case approximation (best in the $l_1$ sense) to the cumulative error curve 90. This results in a distribution of keyframes $k_j$ which varies adaptively to the amount of "action" in the shot. The area to be minimized, as expressed by the integral in Eq. 3 is depicted at 92.

The meaning of the third step above is as follows. The last keyframe of the shot should be as close as possible to the mid point between $t_{K-1}$ and $t=t_K$. Increment $k_i$ and repeat steps 2 and 3 until this midpoint is exceeded for the first time and then take the results of the previous iteration and offset them such that the last keyframe coincides with the midpoint, i.e., $t_K=2k_K-t_{K-1}$, and the $t'_K$ determined by the 3-step iterative method coincides with $t_K$.

Another novelty introduced to the previous algorithm relates to cases where one may overshoot the shot boundary even with $k_1=1$ due to a sufficiently large number of keyframes assigned to this particular shot. In this case, a simple scheme is used to distribute the keyframes in such a way that they are equispaced. In the simple scheme, if a shot has n frames and K frames are to be allocated, every (n/K)th frame is selected as a keyframe.

An Improvement in Keyframe Selection

In Lagendijk's technique, the keyframe for a shot segment $[t_{j-1}, t_j-1]$, given $t_{j-1}$ and $t_j-1$, is always located at $k_j=(t_j+t_{j-1})/2$. In other words, the keyframe is always selected to be in the middle of the segment as representative of the frames in the segment. However going back to the definition of cumulative error, the cumulative error is dependent only on the absolute change between successive frames. Thus, a keyframe in the middle of a segment might not be representative of the actual change between two frames that are separated by more than one frame. Consider a video sequence in which a reporter is talking. Assume that there are two frames which are, for example, 10 frames apart, and that both frames show the reporter with an open mouth. Consequently, the two frames appear to represent very little change, or "action." However, the cumulative change between the two frames might be large, since the cumulative change represents the sum of the absolute changes between successive frames. It is possible that these two frames may be among those selected as keyframes if the "middle of the segment" rule is applied. Thus blindly choosing the "middle of the segment" frame as the keyframe might result in erroneous selection of keyframes.

In this embodiment, the resulting set of breakpoints within each shot, $\{t_0, t_1, \ldots, t_K\}$, obtained by the 3-step iterative method is considered. That frame in the segment $(t_{j-1}, t_j-1)$, which is most different (in terms of the action measure A(.)) from the previous keyframe $(k_{j-1})$, is selected as the keyframe located at $k_j$. This strategy takes the largest difference from the previous keyframe, and is referred to herein as the "largest consecutive difference" criteria, block 84. The first keyframe, $(k_1)$, is taken as the one determined by the 3-step iterative method. This method ensures that the successive keyframes are sufficiently different from each other, thus reducing redundancy as much as possible.

Reducing the Number of Keyframes in Shot Segments without Meaningful Action

Because Lagendijk's technique is entirely based on cumulative error, as explained above, it might report large errors between two frames which are, in fact, very close together. Although the techniques introduced above is good for choosing the most interesting frame in a given shot segment, it does not resolve the situation where the entire shot segment is "uninteresting" from a standpoint of action within the shot segment. For instance, there may be an accumulation of error due to slight camera movement which does not result in much meaningful change between successive keyframes.

In order to ignore shots without any meaningful action, the shots are identified and keyframes for those shots are pruned, block 86, which leaves the finest level of keyframes, block 44. This is done by evaluating the mean and standard deviation of the action measure between successive video sequence frames which lie between two given keyframes is determined and analyzed. If there is enough "meaningful action" between two keyframes, then the action measure between successive frames in the original video sequence is significant, i.e., the keyframe is identified according to the largest consecutive difference criteria, block 84.

Thus if $A_m$ is the mean action measure between keyframes $k_i$ and $k_{i-1}$, and $A_{sd}$ is the standard deviation of the action measure:

$$(s/\beta)^* A_{sd} + A_m < A(k_i, k_{i-1}) \qquad (4)$$

if the content between the two keyframes is interesting, where s is the number of video sequence frames between the two keyframes $k_i$ and $k_{i-1}$. If the shot segment is uninteresting in the above sense, that particular keyframe is deleted and the shot segment is merged with the next shot segment.

The parameter $\beta$ in the above expression is a constant. If $\beta$ is less than 1, only ip keyframes with large differences will survive, which may result in excessive pruning. The value of $\beta$ is chosen to be 2.0 for the simulations reported herein. The quantity $(s/\beta)$ increases if the number of keyframes allocated to the shot is small because the distance between keyframes, and hence the number of frames between keyframes, s, increases, when the number of keyframes allocated to the shot is small. The maximum value that $(s/\beta)$ may achieve is set to $\alpha$, where $\alpha$ is the factor used in defining the threshold for shot boundary detection, in order to limit the amount of pruning of keyframes.

Further experimentation revealed that the linear thresholding scheme might result in uneven keyframe allocation for some choices of total number of keyframes. In order to alleviate this problem, a limit MAXERASE=0.3, is set on the maximum percentage of the total number of keyframes which may be erased by the above pruning method. In the limiting case, the most redundant 30 percent of the frames, corresponding to MAXERASE=0.3, will be removed. The meaning of "most redundant" is to be taken in the sense that $A(k_i, k_{i-1})$ is the smallest for the most redundant keyframe. In this case, $k_i$ will be the redundant keyframe to be removed.

This technique, when applied to a high-motion sequence does not produce any change as expected because the motion is mostly constructive, i.e., Eq. (4) is satisfied for all deleted keyframes; thus, there is no redundancy.

Hierarchical Summary and Browsing

Although the above disclosure describes an intelligent "video indexing" system, such a system provides only a fixed sequence of video frames, which is a more compact representation of the video content than the original full sequence of video frames. In most situations, this representation is still inadequate, as the level of interest in a video sequence varies as one moves along the sequence and the content changes. Also, the level of interest in a particular video content cannot be predicted. Consider a video sequence in which a girl is petting a cat: the camera pans from the girl to the cat. One person might want to see the cat more closely but not the girl; whereas another person might want to see the girl closely but not the cat; yet another person might want to see both of them. The goal is to minimize the number of "uninteresting frame" that any one of these people watch.

In order to reconcile and satisfy diverse viewing requirements with the same video indexing system, a multi-resolutional video browser, block 53, FIG. 2, is provided to allow a user to browse the hierarchical summary by selecting a specific level summary. This is a browser instead of a mere indexing system. A viewer may start at a coarse level of detail and expand the detail with a mouse click at those parts of the keyframe sequence which are more interesting to the viewer. More than one level of detail is required so that the viewer may browse at a viewer-selected pace. The finest level keyframes still may be detected. At a coarser level, similar keyframes at the fine levels are clustered together and each cluster is represented by a representative keyframe.

To solve this clustering problem, a modification of the well known Linde-Buzo-Gray (LBG) algorithm (or Lloyd's algorithm or K-means algorithm) is proposed. Note that it is desirable to cluster similar images together. Assume that images are represented by their histograms and that similar images have similar histograms. Treating each histogram as a feature vector of its associated frame, find (N/r) representative histograms at the coarse level to replace the N histograms in the finest level, where N is the number of keyframes at the finest level. The parameter 'r' is the compaction ratio and is a parameter to be supplied to the program by the user. In the discussion which follows, keyframes are expressed in terms of their histogram vectors.

This is different from a regular clustering problem because it is desired to pick a representative vector to replace, for example, p consecutive vectors (in time). In the regular LBG case, there is no "consecutivity" restriction on the vectors quantized to one representative vector. The following iteration, which is similar to the regular LBG iteration, will always converge. This new 3-step iterative method is referred to herein as "pairwise" LBG, or PLBG. It must be noted that PLBG has the same local minima problems as LBG. Fortunately a "cleanup stage" after the iterations may be used to quickly take care of this. Initially, start with an equally spaced partition of the sequence of histogram vectors. For example, for a compaction ratio of 3, each partitioned set contains 3 histogram vectors (except possibly the last one or two sets). Then go through the following steps for the PLBG method:

1. Assign the centroid (or mean) histogram as the representative vector for each set of vectors.
2. Starting with the first partition, adjust each partition so as to minimize the total $l_2$ norm for the two adjacent sets on either side of the partition (hence the term pair-wise). Mathematically, if $H_{i-1}$ is the representative vector for the vectors in set $(t_{i-1}, t_i)$ and $H_i$ is the representative vector for the vectors in the set $(t_i, t_{i+1})$, adjust $t_i$ such that the total sum of the squared distances of the vectors in each set to the corresponding representative vector is minimized.
3. If, following the adjustment, for any partition, $t_i = t_{i+1}$, delete $H_i$ from the representative set of vectors. If $t_{i-1} = t_i$, delete $H_{i-1}$ from the set of representative vectors.
4. Go to step 1.

The stopping criterion may be either based on the amount of decrease in distortion, or a fixed number of iterations. As previously noted, stop after 10 iterations. At each iteration the distortion ($l_2$ norm between the representative vector of each set and the corresponding vectors in the set) is reduced. Thus, the total distortion at each iteration forms a decreasing sequence. Furthermore, distortion is always greater than or equal to zero. Hence the sequence has a limit by elementary real analysis. Questions such as: "Is there a local minima (and hence a fixed point) for the iteration?" are purely academic and the reader is referred to the literature for such discussion. The deletion step (step 3) might actually result in a slightly smaller number of keyframes were originally expected or selected.

In the above method, after stopping, the frame in the first cluster whose histogram vector is closest to the representative vector is selected as the first keyframe. Keyframes for subsequent clusters may be determined in the same way. Better results are obtained when keyframes are selected within subsequent clusters according to the "largest difference from the previous keyframe criterion", where the difference is expressed in terms of the action measure.

In the formulation of the above iteration, there is a possibility that the last set may be inadequately represented because the last partition is always fixed to the last vector in the sequence. The same may be said for the first frame of the shot, however, such a situation was not observed in the experiments reported herein. Thus, another step is provided after the completion of iteration to resolve this problem. In this final stage, test whether one more representative vector need to be added at the end of the representation. Specifically, consider adding the last vector as the new representative. If the difference between the last vector and the previous representative vector is less than θ×(mean of the differences between all other pairs of successive representative vectors) the last vector is allowed. Chose θ to be 0.75 during the simulations. Note that θ may vary between 0 and 1.

The baseline approach (Lagendijk) misses the scene that has a feature of interest if 3 keyframes are specified and the baseline approach is applied to a video sequence. The results are inferior to that of the most compact (coarsest) level of the multilevel hierarchy with 3 keyframes, generated using the above method. Further, it is much more efficient to utilize the proposed hierarchical approach than applying the baseline algorithm multiple times to obtain different numbers of keyframes to generate a multi-level summary.

Block Histogram Action Measure

Histogram-based action measure is not adequate in all situations. For example, if a black object translates against a white background, the histogram-based action measure would not register the movement. In situations where it is desired to catch fine motion, for example, hand gestures or head movements, it is advantageous to have a better action measure.

Block histograms have been proposed for shot detection. However, it was concluded that block histograms were too sensitive for shot detection and give rise to a number of false alarms. The idea behind block histograms is to split the image into a few blocks (4 or 16 is usual) and define the action measure to be the sum of the absolute histogram differences over each block. It may be easily seen that block histograms would be more sensitive to motion which would not be caught by a simple overall histogram based approach. Block histograms were used experimentally for the finest level keyframes only, as shown in the 3-step iteration method of FIG. 4. The disadvantage of using block histograms is that it is computationally and memory wise more intensive as it is necessary to deal with 4 or 16 histograms per video frame instead of just one. In experimental sequences, however, it was found that the block histogram approach did not result in significant performance improvement.

Using Motion Characteristics for Summarization

The special cases of interest, such as pan or zoom, have not, so far, been considered. In the case of a camera pan, an intelligent browser should (a) detect the frames with a pan and (b) provide an option for the pan frames to be converted into an image mosaic for viewing purposes. Since detection of pan and zoom both involve computing motion vectors, zoom detection along with pan detection may be achieved without much additional computational overload.

Because finding the motion vectors for each frame in a sequence is computationally demanding, a pre-screening method is developed which first detects all possible sequences of frames with dominant, or global, motion. Since dominant motion may be caused by (a) pan, or (b) zoom, or (c) other special editing effect, the detected sequence is examined more closely to determine the existence of a pan or zoom.

Pre-Screening for Dominant Motion

Dominant motion implies that each pixel within the video frame experiences a change in intensity. This change in intensity is usually caused by zoom or camera motion. This change will be most noticeable in edge pixels of the video frame. The approach is to look at each pixel and determine whether it is an edge pixel, and if so to find the difference between the current pixel and the pixel at the same location in the previous frame. If the absolute value of the id difference at an edge pixel is greater than a threshold (PZ_THRESH=15), the pixel is designated as having motion. To determine whether a pixel is an edge pixel, the value attained by the Sobel edge-detection operator at that pixel is compared to a threshold value (PZ_THRESH1=50). If PZ_THRESH is reduced, one might obtain false alarms. If PZ_THRESH1 is reduced, there might not be a significant change at such pixels because they do not belong to strong edges, motion might not cause much intensity variation. In order to determine whether a particular frame is a pan frame, threshold on the ratio (pan ratio) between the number of pixels which are classified as having motion to the total number of edge pixels (PZ_THRESH2=0.9). Another step needed to ensure that the ratio crosses PZ_THRESH2 consistently throughout the pan is to fill out the neighborhood. In other words, an edge pixel has motion if the intensity variation of any pixel within a NEIGH× NEIGH, where NEIGH=5, is greater than PZ_THRESH. Sequences of frames which are shorter than a particular number are rejected (TOO_MANY_FRAMES_NOT_PANZOOM=5). Subsampling may be used to farther reduce computational burden.

Pan Detection

The approach for pan detection is a variation of known techniques. In order to detect a pan, look at the motion vectors at subsampled pixel locations (SPACING=24). The method used to determine motion vector is simple block matching (BLKSIZE=7×7, SEARCHSIZE=24×24). Vary the search size based upon the pan vector of the previous frame: the search size is halved if the previous pan vector is smaller than (SEARCHSIZE/2)−2; original (larger) search-size is restored when the previous pan vector is greater than (SEARCHSIZE/2)−2. This variation results in no performance degradation.

For pan detection, it has been proposed to find all motion vectors parallel to the modal (most frequently occurring) motion vector within a tolerance limit. If the number of such motion vectors is greater than a particular threshold, a pan is detected. However, in the case of a pan, not only are the motion vectors parallel, they also have approximately the same magnitude. Therefore, a small neighborhood of the modal motion vector is examined, instead of looking at all parallel motion vectors. If a tie in the value of a modal motion vector occurs, an arbitrary decision is made. The size of the neighborhood is controlled by VARN (=4). Larger values for VARN would lead to a smaller neighborhood around the modal motion vector (VARN=4 in our case implies a 3×3 neighborhood). PANRATIO (=0.5) determines the threshold on the ratio between number of motion vectors within the neighborhood to the total number of motion vectors. Even if some frames in a sequence of pan frames fall below the thresholds, continuity of the pan is ensured, if the hole is not bigger than 3 (TOO_BIG_A_HOLE=3).

Zoom Detection

Examining the outermost rim of motion vectors in an image, i.e., motion vectors at the edges of the image, should detect zoom conditions. Motion vectors at diametrically opposite positions of the rim should point in opposite directions. Threshold (ZOOMTIO=0.7) on the ratio of motion vectors pointing in opposite directions to the total number of motion vectors. Only the motion vectors on the outer rim are used because the center of zoom might be located anywhere within the image. Thus motion vectors at the outer rim are the best indicators of the presence of a zoom. Additionally, there is not as much foreground motion at image edges.

Color Processing

In this portion of the disclosure, the previously disclosed methods are extended to color sequences. Two different embodiments are described. In the first embodiment, a concatenated histogram consisting of a 256-bin Y-histogram and two 128-bin U and V histograms is used. In the second embodiment, a simple 256-bin Y-histogram is used. For some experimental sequences, no significant change in results were observed. In both cases the activity measure is defined as in Eq. 1. However, in some sequences using a color histogram may be crucial for detecting change between two video frames, e.g., the luminance stays nearly the same but chroma values change.

Summary of the Uncompressed Video Input Method

A block diagram of the hierarchical summary and browsing method is shown in FIG. 2. The dissolve, fade in/fade out, removal module is explained in the cited related application, and included herein by reference, and discloses a dissolve detection method. The module is used to convert a dissolve into an abrupt scene transition by removing the transition frames from the video sequence. The finest level keyframe detection block is expanded in FIG. 4, where major steps are shown. The automatic pan/zoom auto processing module is presented in detail in FIG. 3. It automatically (a) detects and builds a mosaic (panoramic) image if there is a pan and (b) detects and finds the first and the last frames of a zoom sequence. It also excludes the pan/zoom related keyframes from the finest level keyframes, so that only non-pan and non-zoom frames participate in the hierarchical keyframe generation process. This removal and auto pan/zoom processing is optional and may be enabled interactively at only certain portions of the video clip by the user if desired. The GUI will allow the user to start browsing the video at a particular level of summary (among the various levels generated by the hierarchical browser). For instance, the coarsest summary along with mosaic images and zoom summary may be presented first. Then, the user may interactively retrieve/playback frames at finer hierarchy levels. With the click of a button the user may access either the parent-children of the keyframe currently being viewed. Choosing the parent will result in the replacement of a group of keyframes at the current level by a single keyframe which is their parent. Choosing the children will find all the child keyframes corresponding to the current keyframe. FIG. 5 illustrates this concept of parent and child keyframes. At the finest level further expansion, i.e., the children at the finest level, will lead to the playing of the video clip between specified keyframes. At the time the video is played, sound corresponding to that part of the video clip may also be synchronously played. This functionality of playing the video clip may also be provided at coarser levels of the hierarchy.

The video browsing method described herein may have applications which go beyond simply providing an effective user interface for multi-media manipulation. It provides an understanding of the temporal nature of the video sequence which may be potentially employed in second generation video coding systems, reminiscent of second generation image coding systems. For example encoders designed to deal with an MPEG-2 bitstream blindly adapt an IBBP or IBBBP format. However, a hierarchy of keyframes may be used in designing encoders which intelligently, and more importantly, computationally efficiently, adapt to the nature of the temporal video stream thus providing higher quality while utilizing lesser resources. Information on how to utilize a hierarchy of video frames in improving compression is available in the literature, where the multi-scale nature of a segmentation algorithm is exploited to obtain lossless still image compression. A major difference between second generation image coding systems and second generation video coding systems is that the former necessitated a fundamental change in the coding mechanism, and hence failed to make much impact, while the latter may be incorporated within any of the existing video coding standards.

Computational Performance

The computational performance of the keyframe generation method depends heavily upon the hard disk access speed of the computer used to practice the method of the invention. In the following discussion, "real time processing" means the ability to process 30 frames per second at a given resolution. For a 300 frame quarter common intermediate format (QCIF) color sequence (176×144 resolution), it was found that construction of the histograms took 11 seconds, while the rest of the processing took less than a second on a SUN® Ultra SPARC-2®. Thus, provided that histogram computation may be achieved in real time, it should be easy to achieve real time hierarchical keyframe generation. It may also be noted that the processing after the computation of the histograms is independent of the actual frame resolution, thus the amount of time taken to process a 300 frame QCIF sequence is the same as that of processing a sequence at 1024×780 resolution, provided that the histograms of each frame have been pre-computed.

Currently global motion detection may be carried out in real time. However, due to the heavy computational burden associated with the block matching algorithm, which is required for pan/zoom detection, pan/zoom processing may not be carried in real time in a software implementation.

Compressed Video Input

In the foregoing discussion, only uncompressed or decompressed bitstreams were considered and used in the experiments. However most of the available video streams are in a compressed format for compact storage. The method of FIG. 4 may be extended to a compressed bitstream in such a way as to extract keyframes while performing minimal decoding. It will be appreciated that a brute-force method of dealing with compressed video may be simply to decompress the entire video stream, thereafter using the techniques described herein for uncompressed video.

Figure 7:
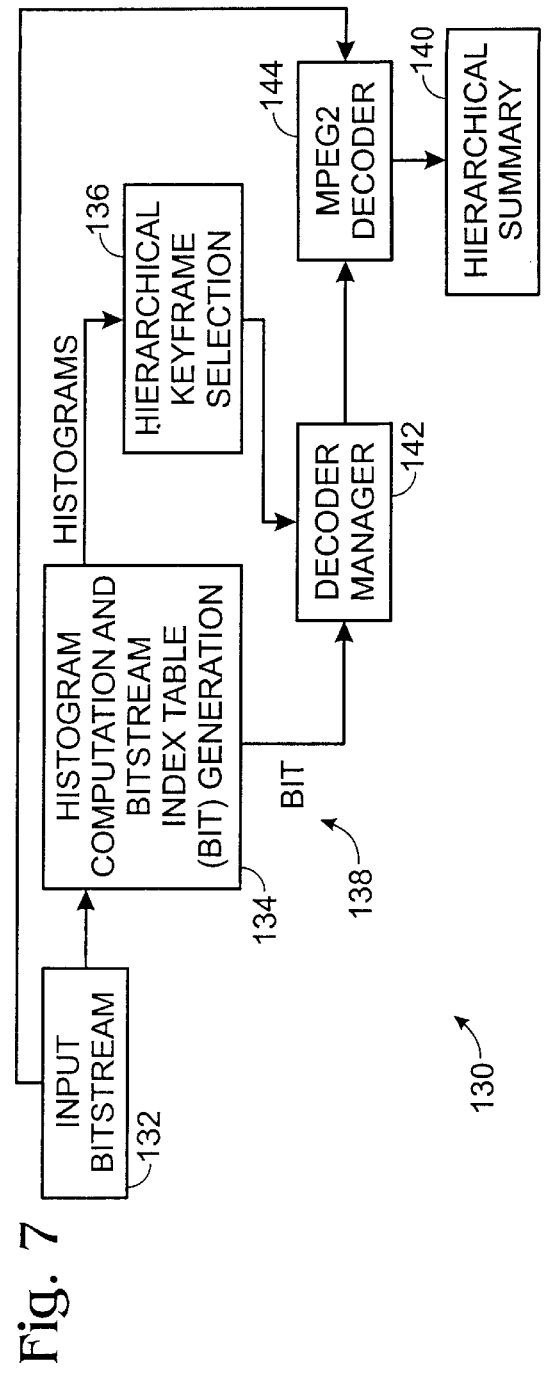
FIG. 7 is a block diagram of a portion of the second embodiment of the invention for use with an MPEG-2 compressed input video.

This portion of the disclosure deals with a variation of hierarchical summarization and browsing of digital video as may be used with MPEG-2 bitstreams. The overall scheme is summarized in the flow diagram given in FIG. 7. A novel way of computing histograms is disclosed. Histograms of DC coefficients of 8×8 blocks are used. The process begins with an input bitstream 132. Histogram computation 134 for I pictures is therefore straightforward by methods well known to those of ordinary skill in the art. Histogram computation for predicted pictures (P and B frames), without fully decoding their reference frames, is performed as disclosed later herein, resulting in increased accuracy in histograms and hence in keyframe selection 136. Hierarchical keyframe selection 136 determines the identities of the keyframes of the hierarchical summary, for instance, in terms of their temporal display order, and provides this summary information to a decoder manager, that will be described later herein. Once the histograms of DCT coefficients are generated, hierarchical keyframe selection is performed as taught in connection with FIG. 4.

It should be noted that a mechanism for detecting dissolve regions in the video, such as the one disclosed in my co-pending application: "Detecting Dissolve Regions in Video Sequences," cited above, may be easily integrated to processing block 134 in FIG. 7 that performs histogram computation and BIT generation. Namely, frames contained in a dissolve region may be marked within BIT and ignored in the subsequent keyframe selection process. Otherwise, frames within the dissolve region may give rise to spurious keyframes.

The method generates a record of the bitstream, concurrent to histogram computation 134 that contains information about each picture, such as their byte offset location in the bitstream, their reference frames, and the quantization matrix used in quantizing the DCT blocks. In the current invention, a table referred to as the "bitstream index table" (BIT) is generated. The contents of BIT 138 and the method of generating BIT is discussed in detail later herein.

Figure 8:
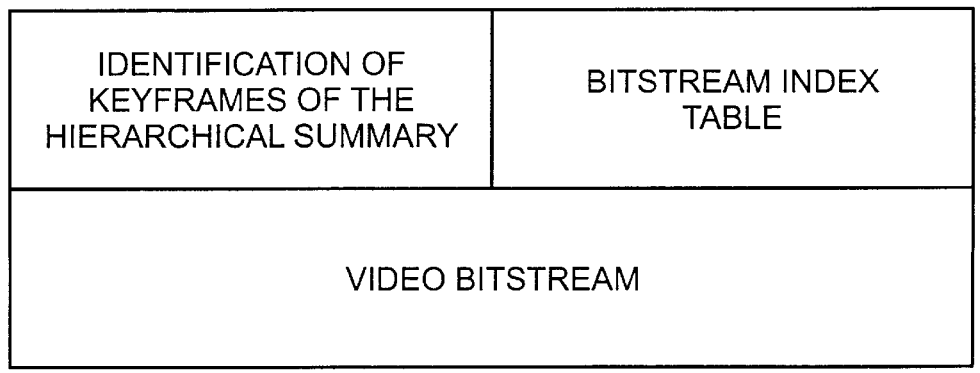
FIG. 8 is a representation of the data that may be used to decode the keyframes in the hierarchical summary.

One purpose of BIT 138 is to capture the essential parameters of the bitstream in order to enable decoding of the keyframes for generating a visual summary without the need for decoding or parsing the entire bitstream. Parsing requires that the system look at every bit in the video stream, regardless of whether the video stream is decoded or not. In addition, the BIT or a slimmed down version of BIT, is provided along with the original bitstream and the identity of the summary, as depicted in FIG. 8, for efficient browsing by the user when the user, for instance, wants to visually display the summary or playback the video between two keyframes. Later herein, a specific embodiment of the method is described wherein a summary is presented to the user and some interactivity is provided. Note that in FIG. 8, the bitstream may reside in memory located at a different physical location than the BIT and the identity of summary frames. For instance, bitstreams may reside in a database server and the summary and the BIT may reside at the local machine. Alternatively, all three types of data may reside in the same medium such as a DVD disk or any other high capacity storage medium. Methods for further compaction (or pruning) of BIT are discussed in the section entitled "Generating a pruned bitstream index table for compact storage." It should be appreciated that, having generated BIT, and having decided to "prune" the size of BIT, any number of techniques may be used to down-size BIT. A single example is provided herein. It should also be noted that it is possible not to form and store a BIT at all, but to parse the entire bitstream and decode everytime a keyframe needs to be decoded.

Referring again to FIG. 7, during generation of hierarchical summary 140, the information contained in BIT is utilized by decoder manager 142 to selectively decode the keyframes, passed to an MPEG-2 decoder 144, and, once decoded, forms hierarchical summary 140. Decoder manager 142 performs a similar task during the presentation stage, as the user desires to browse through the video by playing back video between the keyframes. The working principles of the decoder manager (that may be implemented by a computer program, for instance) are discussed below.

The invention may be implemented within a video camera that is storing MPEG-2 compressed video, subsequent to recording. In such a case, the summary information and BIT may be stored in a storage system that also stores the video stream, or they are stored in any memory location that is linked with the video stream in a well-defined fashion. The hierarchical summary itself, containing the keyframes, or their subsampled versions, may also be stored in a storage system for immediate access. On-camera user interface may be provided for identification of video content stored in the camera, on tape, or on any other storage medium on the basis of the hierarchical summary.

Alternatively, bitstreams may be downloaded from a camera to a computer where the summarization process is carried out. In this case, the summary may be copied back to the tape or any other storage medium holding the video data, or onto some other memory that is linked with a well-defined link to the video bitstream. For instance, cameras that directly record compressed MPEG streams are currently available (e.g., Hitachi MP-EG1A camera) where bitstreams may then be downloaded to a PC. The system of the current invention may be used to process such bitstreams on a PC platform.

The following issues must be addressed and resolved in order to make the hierarchical video summary work efficiently with MPEG-2 bitstreams:
1. Generate a keyframe hierarchy while performing minimal decoding of the MPEG-2 bitstream.
2. Establish a procedure for decoding the selected keyframes from the MPEG-2 bitstreams without having to decode all the frames.
3. Develop a strategy to decode a stretch of frames between two given keyframes.

This approach works at the histogram level. A method is disclosed that computes a color histogram for each frame while minimally decoding the MPEG-2 bitstream.

Figure 9:
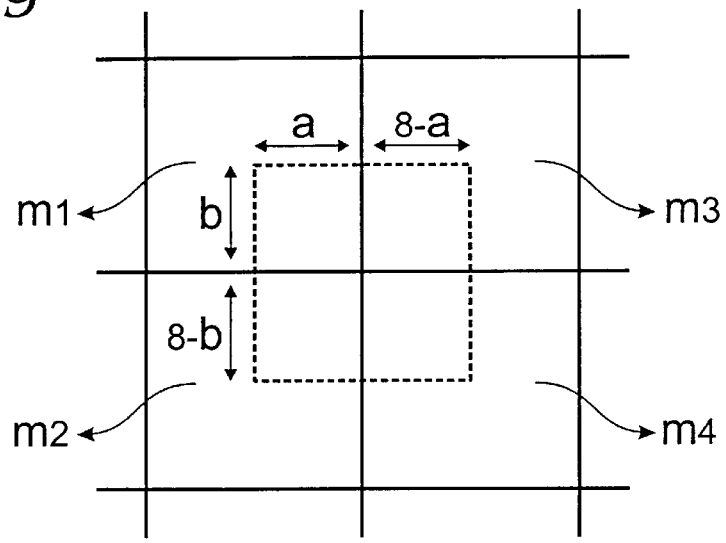
FIG. 9 is a graph of motion compensation.

Histogram computation and consequently subsequent processing is insensitive to subsampling by a factor of 8 in each dimension. Going one step further, it was found that histograms computed using only the DC component of the DCT of 8×8 blocks, i.e., the mean of 8×8 blocks, were sufficient for practical purposes. For motion compensated images, it has been proposed that approximate motion compensation could be used to reduce the computation while obtaining negligible degradation in performance. According to the block matching scheme used in the MPEG standard, a 16×16 macroblock motion vector may overlap, at most, four other 16×16 macro blocks in the reference frame from which motion compensated prediction is being performed. Similarly each 8×8 sub-block within the 16×16 macro block overlaps, at most, four other 8×8 sub-blocks. Thus, it was suggested that each 8×8 sub block may be approximated by a weighted average of the values in each of the 8×8 sub-blocks that it overlaps. The weights assigned to individual blocks could be made proportional to the area of the overlap. Referring to FIG. 9, the 8×8 sub-block's mean value is:

$$((a)(b)(m_1)+(8-a)(b)((m_3)+(a)(8-b)(m_2)+(8-a)(8-b)(m_4)+\Delta_{DCT})/64$$

where $\Delta_{DCT}$ is 8 times the DC component of the residual DCT for the block (the factor of 8 comes in because the DC component of the residual DCT for the block used in the MPEG-2 standard is one-eighth of the mean value of the residual error of the block). Histograms are obtained by updating the histogram vector with the mean of each 8×8 block within the image found as in Eq. 5. The above method of obtaining histograms has certain problems leading to possible degradation of performance. One of the improvements of the method of the invention is to propose a better way of handling histogram computation for MPEG bitstreams.

MPEG bitstreams incorporate complicated coding strategies which necessitate decoding information from other parts of the bitstream before one may attempt to decode a particular frame. A successful video browsing strategy also needs to address the problem of decoding particular video frames in the minimum amount of time.

Computing Histograms from MPEG Bitstreams

Decoding an MPEG bitstream involves two computationally intensive steps:
1. Obtaining inverse DCT of 8×8 blocks.
2. Motion compensation with 16×16 macro blocks in the case of MPEG-2 bitstreams, the blocks may be smaller or have only even/odd fields.

Previously, it was pointed out that replacing an 8×8 block by its mean value does not have much effect on the histogram of the image. In this implementation, each 8×8 block is replaced by 8×(DC value of the DCT coefficients). From the formula for inverse DCT computation it may be seen that this yields the mean value of the block, accurate within compression related quantization error.

In order to understand the next step, a brief review of the coding strategy employed in an MPEG bitstream is provided. A typical MPEG bitstream has three kinds of frames:
I (intra-coded frame),
B (bi-directionally predicted frame), and
P (predicted frame).

I frame contains only DCT data (no motion compensation is performed). Thus using the DC value of DCT coefficients to compute a histogram completely covers the problem of minimally decoding I frames. B and P frames involve the additional step of using block motion vectors to predict the current frame from previously decoded reference frame(s). Note that the previous decoded frame available has itself only been partially decoded. Thus, the strategy to be used in decoding the B and P frames must be carefully considered. In the following discussion, Case (a) refers to a motion compensation scheme which already exists and is commonly used in literature. Case (b) refers to a new motion compensation scheme that is disclosed herein.

Figure 10:
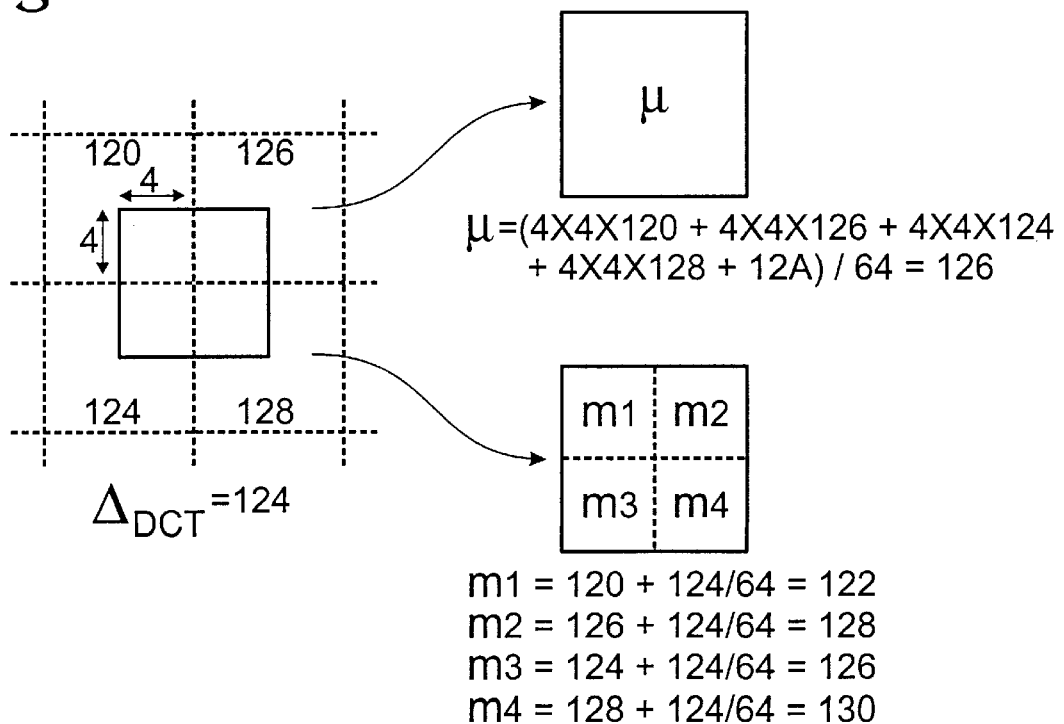
FIG. 10 is an illustration of the difference between the motion compensation algorithms used to define Case (a) and Case (b).

In order to simplify motion compensation, most known methods use the scheme given in the previous section, where each 8×8 sub-block is replaced by the weighted average of the 8×8 sub-blocks it overlaps. Consider the two scenarios: Case (a) replace the 8×8 sub-block with the weighted average of overlapped blocks in the partially decoded reference frame and Case (b) replace the 8×8 sub-block with the exact pixels from the partially decoded reference frame. In Case (a), it will be seen that the entire 8×8 block in the motion compensated predicted frame will have a single value. In Case (b), the 8×8 block may potentially have many different values (i.e., pixels within it may have many different values). In order to illustrate this further, consider an example of an 8×8 block going through Cases (a) and (b). FIG. 10 illustrates this. In FIG. 10, assume that the prediction block is obtained from an I frame i.e., each 8×8 block has a single value associated with it in the prediction frame. Case (a) will lead to an 8×8 block in the current frame which has only one value $\mu$. Case (b), will lead to an 8×8 block in the current frame which has potentially four different values.

This does not cause much difference in the first few motion compensated frames (P or B frames) following an intra-coded reference frame (or I frame). In fact, because of the insensitivity of the histogram computation to averaging and sub-sampling, it would seem that the two procedures will be equally effective for histogram computation. However, Case (a) should be favored because it involves less computation and memory consumption. This occurs because in any given frame (I or P or B), with motion compensation performed as in Case (a), only one value for each 8×8 block will be obtained. Thus, 8 times less capacity is needed in each dimension i.e., potentially 64 (8×8) times lesser memory than for storing entire frames. However, Case (a) might lead to excessive degradation, as explained below, and hence is not a viable alternative.

As the number of contiguous motion compensated frames, i.e., without an intervening I frame, increases, the difference between Case (a) and Case (b) increases. Referring back to FIG. 3, consider what happens when prediction is attempted from an already motion compensated frame, for example, from a P frame to a B frame or from a P frame to another P frame. In Case (a), the weighted averaging operation is applied on the four blocks the prediction block overlaps, each of which has a single value, and finish with a single value for the entire 8×8 predicted block. In Case (b), because each block in the prediction frame may have potentially four (or more) different values, the current predicted block may have a large number of different values. Now, one should note the key difference which emerges between Cases (a) and (b) as this chain of prediction from already motion compensated frames becomes large. Given a sufficiently long sequence of motion compensated frames, one would expect Case (a) to yield a single value for the entire frame, provided that there is sufficient motion between frames, as described later herein. This however, does not occur in Case (b).

In order to explain this phenomenon more thoroughly, consider replacing each 8×8 block in the I frame by its mean to produce a smaller version of the original image. Now, motion compensation as implemented in Case (a) necessitates recursive application of a 2×2 averaging filter repeatedly on this small image. From elementary Fourier analysis, it may be easily shown that repeated application of an averaging filter would lead to a uniform image in the limit, neglecting edge effects.

It was observed in practice that the above observations hold true. For a typical MPEG-2 compressed sequence the distance between two I frames is 15. It was found that this lead to a very noticeable degradation of performance when motion compensation was performed according to Case (a). The motion compensation scheme of Case (a) produces a strong periodical variation in the histograms which leads to spurious keyframe detection. Thus, Case (b) was used for implementation. Computing the histograms using the minimal decoding method cuts the histogram computation speed by half for a QCIF sequence, although the advantage was found to be larger for a higher resolution. Currently, a 512-dimensional histogram vector is used, and is formed by concatenating a 256 bin grey scale (Y component) histogram, a 128 bin U component histogram and a 128 bin V component histogram. Note that the above discussion is applicable to Y, U and V components of a frame individually, regardless of chroma format.

Extracting Particular Frames from an MPEG-2 Bitstream

Extracting particular frames from an MPEG-2 bitstream, in the embodiment described herein, is a two step procedure. In the first step, which is carried out concurrently with the histogram calculation, a "bitstream index table" is generated which contains the information necessary to quickly decode a randomly picked frame from the MPEG-2 bitstream. Once the keyframe hierarchy is generated, i.e., identities of keyframes that will be in the hierarchical summary are defined, only the keyframes at the finest level of hierarchy need be decoded; frames at a coarse level of the hierarchy are a subset of the frames at the finest level. The second step in the keyframe extraction procedure is carried out by the decoder manager, as explained below, which uses the bitstream index table generated in the first step.

The advantage of the above two step procedure over decoding relevant portions of the bitstream directly is a saving in time that would be required to review the entire bitstream to the frame of interest. In order to decode frame number 1350 from a 1400 frame MPEG-2 bitstream without a bitstream index table, it is necessary to parse the entire bitstream up to frame number 1350, although it might not be fully decoded. This takes a considerable amount of time. If a bitstream index table is available, one may go directly to the relevant portions of the bitstream; thus parsing and decoding at absolute minimum amount is only required.

The following information is needed in order to decode a randomly picked frame, referred to herein as the current frame, from an MPEG-2 bitstream:

1. The most recent Sequence Header in the past (its byte offset).
2. The byte offset of the current frame into the bitstream.
3. The most recent Quantization Matrix reset (if any) in the past (its byte offset).
4. The reference frames (I-P/I-I/P-P) corresponding to the current frame, if the current frame is a B frame (their byte offsets).

5. The most recent I frame (which is the P frame's reference frame) if the current frame is a P frame (its byte offset).

It is to be noted that in the Case of B/P frames, several frames other than the reference frame(s) may need to be decoded in order to correctly decode the reference frame(s). A common data structure to hold the above information has been developed to facilitate information exchange between the two steps, i.e., (1) generating the bitstream index table and (2) using the bitstream index table of the frame extraction method by the decoder manager, described later herein. The following segment of C-code embodies the different flags used in formulating the bitstream index table, although it will be appreciated that this is merely an example, and that BIT may have any number of different syntax forms:

enum IndexFileState {
K_SEQUENCE_HEADER=0,
K_PICTURE_IFRAME,
K_PICTURE_BFRAME,
K_PICTURE_PFRAME,
K_QUANT_MATRIX_EXTENSION,
K_END_OF_DATA,
K_OFFSET
};

The K_OFFSET flag is added to any byte offset to differentiate it from the other flags defined above. Thus a byte offset of 15 would translate to 15+K_OFFSET(=21) in terms of our representation. K_END_OF_DATA is used a de-limiter between different events (for example sequence header and I frame or I frame and B frame etc.). To understand how the bitstream index table generated appears, suppose that the following sequence of events needed to be coded:

1. Sequence Header starts at 0 bytes.
2. I picture at 150 bytes
3. P picture at 3000 bytes
4. B picture at 4200 bytes
5. B picture at 5300 bytes
6. Quant Matrix reset at 5400 bytes
7. P picture at 6200 bytes This sequence is converted into the following representation:

K_END_OF_DATA K_SEQUENCE_HEADER K_OFFSET+0 K_END_OF_DATA
K_PICTURE_IFRAE K_OFFSET+150 K_END_OF_DATA
K_PICTURE_PFRAME K_OFFSET+3000 K_END_OF_DATA
K_PICTURE_BFRAME K_OFFSET+4200 K_END_OF_DATA K_PICTURE_BFRAME K_OFFSET+5300
K_QUANT_MATRIX_EXTENSION K_OFFSET+5400 K_END_OF_DATA
K_PICTURE_PFRAME K_OFFSET+6200 K_END_OF_DATA

This in turn will yield a byte representation, using the C-data structure given above, of:

5 0 6 5 1 156 5 2 3006 5 3 4206 5 3 5306 4 5406 5 2 6206 5

The spaces in the above byte-wise representation are necessary for the decoder to parse the bitstream. Note that the K_END_OF_DATA flag is, strictly speaking, redundant. How ever this flag may be used to prune out any spuriously generated data (due to errors in the bitstreams), thus making the algorithm error resilient. The flag acts as a "sync signal" to remove spurious data; for example a sequence header not followed by a byte offset (due to an error in the bitstream) will be discarded.

The decoder manager which uses the above generated "bitstream index table" functions as follows:

1. Initialize the last decoded frame number (ldf) to −1
2. For each frame to be decoded (ftd)
    Find the frame at which to start decoding (sdf).
    If ftd is an I frame, then sdf=ftd.
        If ftd is a P frame, then sdf=most recent I frame before ftd.
        If ftd is a B frame, then sdf=most recent I frame before both of the anchor frames corresponding to ftd.
        If sdf obtained above is less than ldf+1 set sdf=ldf+1. Thus if sdf<ldf+1 some of the required frames have been already decoded.
    For i=ldf+1 to sdf
        Find the most recent sequence header (rsh).
        Find the most recent quant matrix reset (qmr), if qmr is greater than rsh (if any).
    Decode rsh, qmr in the order they appear in the bitstream.
    Decode all I and P frames sequentially starting from sdf till ftd−1.
    Decode ftd.

In order to decode a stretch of frames, decode the first frame (ftd) following the decoder manager procedure, above. The rest of the frames are sequentially decoded till the end of the stretch.

Field pictures need to be taken care of as a special case, if needed. One may possibly use the histograms of the even/odd fields, which ever is decoded first. The other field may not be decoded, in the case of B pictures, or may be decoded with the minimal decoding strategy, in the case of P and I pictures. The histograms need to be scaled by a factor of 2 if only one field is being decoded. It may also be possible that the extra decoded field may not be used in the computation of the histograms for P/I frames; in this case the histograms need not be scaled, because all frames have only one field contributing to the histogram. In order to differentiate fields from frames and take appropriate steps, the MPEG-2 bitstream provides two pieces of information from the picture header and picture coding extension:

1. temporal reference (in the picture header) provides the frame number being currently decoded. Note that the temporal reference is reset at the start of every Group of Pictures header.
2. the picture structure (in the picture coding extension) provides the top/bottom field information.

Generating a Pruned Bitstream Index Table for Compact Storage

An important issue from an implementational point of view is the compact representation of the BIT to save disk space. At a first glance this might not seem important, since the bitstream index table may take only about 8–10 bytes of space for each frame, comparing with the large space occupied by the MPEG video. The over head may be reduced by taking the following steps:

1. Using incremental byte offsets rather than absolute byte offsets. This results in a good amount of saving for large sequences.
2. Using a simple text compression algorithm, like gzip on Unix platforms or pkzip on PCs.
3. Removing the END_OF_DATA flag.
4. Pruning the bitstream index table to store the minimal amount of information necessary to decode the key-frames with minimal decoding and parsing of the bitstream.

Note that the last item will allow access to only the keyframe locations and does not let the user change the locations of the keyframes later on. It may be also noted that (1) and (4) are not completely compatible. If incremental byte offsets are to be used, the pruning algorithm of (4) should change the byte offsets to reflect the changed order of frames. In the current implementation, a Pruned Bitstream Index Table is generated, as described below. The decoder manager subsequently uses this pruned version of the table. The decision to use a pruned bitstream table is a function of the amount of storage space available and speed that is to be obtained: if storage space is available, there is no need to prune the bitstream table, as there will be room for the full table, and retrieval and manipulation will be much quicker.

Pruned Bitstream Index Table

The same structure is used as for the bitstream index table (BIT) but with a different organizational syntax to develop the Pruned bitstream index table (PBIT). Each keyframe is represented as a unit (between two K_END_OF_DATA flags) as opposed to each video frame being represented as a unit in the BIT. The following information is necessary in order to decode a particular (current) keyframe without parsing and decoding the entire bitstream:

1. The type of current keyframe I/B/P.
2. The Start Decode Frame (sdf) corresponding to the current keyframe (byte offset). Note that the actual sdf in terms of byte offset (not ldf+1, if sdf<ldf+1) needs to be stored because the decoder might not be operating sequentially to decode all the keyframes, as was assumed to be in the BIT version of the decoder manager. In the case that the decoder is operating sequentially and sdf<ldf+1, then decoding needs to start from ldf+1. This information is already available as ldf+1 is the video frame following the previous keyframe, whose offset is available.
3. Byte offset of the current keyframe.
4. The most recent sequence header offset. There is no need for the K_SEQUENCE_HEADER flag, as every valid MPEG-2 bitstream has a sequence header.
5. If there was ever any quantization matrix reset, the quantization matrix offset needs to be stored, with the K_QUANT_MATRIX_EXTENSION flag, because there may not be any quantization matrix reset in a valid MPEG-2 bitstream. Note that quantization matrix resets need not be stored if the reset occurs before the sequence header since the sequence header's appearance automatically resets the quantization matrix.

The decoder manager uses the sdf information, the type of the current keyframe and its byte offset as follows: if the desired current keyframe is of type I or P, the decoder manager will start decoding at sdf, and will parse the bitstream and look only for I and P frames. Such I and P frames will be decoded until the current desired keyframe is reached, which is also decoded. In this technique, the decoder manager does not have to check to see if any frame is a B frame and thus looks for only I and P frame headers. If the desired current keyframe is of type B, the decoder manager will consider each frame starting from sdf, will decode all I or P frames, and stop at every B frame and check to see if that frame is the desired keyframe.

If the keyframe is of type B, one may want to approximate it with its most recently decoded reference (I or P) frame, in order to eliminate the need for parsing B frames.

Suppose that a B frame is the keyframe to be decoded which starts at 53500 bytes offset, needs a quantization matrix to be read from 43000 bytes and a sequence header to be read at 39000 bytes. The frame to start decoding begins at 45000 bytes. This data is encoded thus:

K_END_OF_DATA K_PICTURE_BFRAME K_OFFSET+45000
K_OFFSET+53500 K_OFFSET+39000
K_QUANT_MATRIX_EXTENSION K_OFFSET+43000 K_END_OF_DATA

It should be clear that PBIT may be further slimmed down at the cost of increasing computational time by increasing the amount of parsing that the decoder manager performs. Hence, there is a tradeoff between complexity of decoder manager and the size of PBIT. An appropriate balance may be made depending on application requirements. For instance, the PBIT may store the sdf and the byte-offsets of all I and P frames between the sdf and the current keyframe and the byte offset of the current frame, eliminating the need for the decoder manager to parse the bitstream. The consequence, however, is an increase in size for PBIT. At the other extreme, only the sdf and the byte offset of the keyframe is stored, resulting in the most compact representation for PBIT but requiring that the decoder manager parses the bitstream between the start frame and the keyframe positions and decodes the I and P frames.

In order to incorporate automatic pan/zoom detect/extract functionality, the entire frame bitstream may need to be decoded.

Thus a system for reviewing keyframes of a digital video sequence has been disclosed. The input video stream may be conventional digital video, or may be an DCT-based compressed stream. Although a preferred embodiment of the invention, and several variations thereto have been disclosed, it should be appreciated that further variations and modifications may be made thereto without departing from the scope of the invention as defined in the appended claims.

What is claimed is:

1. A method of hierarchical digital video summarization and browsing comprising:

inputting a digital video signal for a digital video sequence; and generating a hierarchical keyframe summary;

developing at least one coarser level summary from a given keyframe summary wherein said developing includes statistical clustering using a pairwise K-means clustering algorithm, of histogram vectors of keyframes.

2. The method of claim 1 where only those keyframes that are consecutive in time are allowed to be included in the same cluster.

3. The method of claim 1 which includes selecting keyframes to represent keyframe clusters and choosing keyframes as those frames within the clusters whose histogram vectors are closest to the centroid vectors of the clusters.

4. The method of claim 1 wherein said selecting includes selecting the keyframes in the second and existing subsequent clusters on the basis of largest difference-from-the-previous-keyframe criterion.

* * * * *